US012806797B2

(12) United States Patent
Yamane

(10) Patent No.: US 12,806,797 B2
(45) Date of Patent: Nov. 24, 2026

(54) EXTERIOR WALL REPAIR DEVICE AND EXTERIOR WALL REPAIR METHOD

(71) Applicant: Share-RIZ Co., Ltd., Fukuoka (JP)

(72) Inventor: Satoru Yamane, Fukuoka (JP)

(73) Assignee: Share-RIZ Co., Ltd., Fukuoka (JP)

( * ) Notice: Subject to any disclaimer, the term of this patent is extended or adjusted under 35 U.S.C. 154(b) by 337 days.

(21) Appl. No.: 18/287,649

(22) PCT Filed: Dec. 2, 2022

(86) PCT No.: PCT/JP2022/044517

§ 371 (c)(1),
(2) Date: Oct. 20, 2023

(87) PCT Pub. No.: WO2023/188546

PCT Pub. Date: Oct. 5, 2023

(65) Prior Publication Data

US 2024/0181651 A1 Jun. 6, 2024

(30) Foreign Application Priority Data

Mar. 30, 2022 (JP) ................................ 2022-056380

(51) Int. Cl.
*B25J 13/08* (2006.01)
*E04G 3/32* (2006.01)
(Continued)

(52) U.S. Cl.
CPC ................ *B25J 13/08* (2013.01); *E04G 3/32* (2013.01); *E04G 23/0203* (2013.01); *E04G 2003/286* (2013.01)

(58) Field of Classification Search
CPC ... B25J 13/08; B25J 5/00; B25J 19/021; B25J 5/02; E04G 3/32; E04G 23/0203;
(Continued)

(56) References Cited

U.S. PATENT DOCUMENTS 2,543,348 A * 2/1951 Briese ..................... B63B 59/06
451/75
4,993,913 A * 2/1991 Ohtsuki .................... E04G 5/04
901/41
(Continued)

FOREIGN PATENT DOCUMENTS

CN 110528908 12/2019
JP S62233373 10/1987
(Continued)

OTHER PUBLICATIONS

"International Search Report (Form PCT/ISA/210) of PCT/JP2022/044517", mailed on Jan. 24, 2023, with English translation thereof, pp. 1-6.

*Primary Examiner* — Gregory W Adams
(74) *Attorney, Agent, or Firm* — JCIPRNET

(57) ABSTRACT

An exterior wall repair device includes a travel path body, a carriage having a traveling part capable of traveling on the travel path body and winch devices, a repair device main body having a gondola suspended and moved up and down by the winch devices, a manipulator arranged in the gondola and performing repair work, a shooting part capable of shooting images of the state of working by the manipulator, a vacuum device for detachably fixing the gondola to an exterior wall surface, and a belt having both end portions fixed to attaching/detaching means of the fixing device and wound around a drive part of the manipulator, and a remote control part having a monitor on which an operator can see an image from the shooting part and operation gloves operated by the operator and capable of remotely operating the manipulator in synchronization with the manipulator.

3 Claims, 5 Drawing Sheets

(51) Int. Cl.

| | |
|---|---|
| ***E04G 23/02*** | (2006.01) |
| *E04G 3/28* | (2006.01) |

(58) Field of Classification Search
CPC .............. E04G 2003/286; E04G 3/325; E04G 23/0296; E04G 5/04; B62D 57/024; Y10S 180/901; B05B 12/00; B05B 12/004
See application file for complete search history.

(56) References Cited

U.S. PATENT DOCUMENTS

| | | | | |
|---|---|---|---|---|
| 10,952,801 | B2 * | 3/2021 | Miller | A61B 34/30 |
| 11,135,611 | B2 * | 10/2021 | Lim | B25J 11/0085 |
| 2019/0374966 | A1 * | 12/2019 | Thompson | B05B 15/50 |

FOREIGN PATENT DOCUMENTS

| | | |
|---|---|---|
| JP | H05253869 | 10/1993 |
| JP | 2646008 | 8/1997 |
| JP | 2007007837 | 1/2007 |
| JP | 2007139707 | 6/2007 |
| JP | 2010013901 | 1/2010 |
| JP | 2010089222 | 4/2010 |
| JP | 2021017764 | 2/2021 |
| TW | 201428163 | 7/2014 |
| WO | 2017208281 | 12/2017 |

* cited by examiner

EXTERIOR WALL REPAIR DEVICE AND EXTERIOR WALL REPAIR METHOD

CROSS-REFERENCE TO RELATED APPLICATION

This application is a 371 application of the International PCT application serial no. PCT/JP2022/044517, filed on Dec. 2, 2022, which claims the priority benefits of Japan Patent Application No. 2022-056380, filed on Mar. 30, 2022. The entirety of each of the above-mentioned patent applications is hereby incorporated by reference herein and made a part of this specification.

BACKGROUND

Field of the Invention

The present invention relates to an exterior wall repair device and an exterior wall repair method. More specifically, the present invention relates to ones capable of performing repair work of an exterior wall of a building by remote control without erecting scaffolding around the building.

Background Art

Cracks in tiles, decolorization of surface coating agents, or degradation, cracks, etc., of sealants are caused on exterior walls of buildings due to aged deterioration, and infiltration of rainwater, etc., may result in falling of the tiles. As a countermeasure, a diagnosis for periodically checking the state of degradation of exterior walls is performed and repairs to necessary places are made based on the result of the diagnosis.

The diagnosis and the repair work of exterior walls have conventionally been performed with scaffolding erected around the building while ensuring the safety of workers. However, there are disadvantages that the work using the scaffolding requires removal of the scaffolding after the erection and that the diagnosis and the repair work are costly and also the work period is long. Accordingly, for example, when such work is planned in a residents' association of an apartment building, especially the burden of the diagnosis and repair costs has been a major hindrance to the execution of the plan.

Therefore, various devices have been made to reduce the burden in recent years. For example, many proposals have been made as means for diagnosing exterior walls without using the scaffolding, and one of them is a wall surface examination system described in Patent Literature 1.

In the wall surface examination system described in Patent Literature 1 above, a terminal computer that obtains hammering sound data and a wall surface image from an examination terminal suspended on a wall surface of a building to be examined compares the hammering sound data and reference hammering sound data to create diagnostic data.

In a management computer, then, the diagnostic data output from the terminal computer and stored building base drawing data of the building to be examined are synthesized, a diagnosis result synthesized building drawing is output together with an examination result chart data table from a printer, and the wall surface examination of the building to be examined is carried out simply and at low cost to check the condition of the wall surface.

CITATION LIST

Patent Literature

Patent Literature 1: Japanese Unexamined Patent Application Publication No. 2007-139707

SUMMARY OF THE INVENTION

Technical Problems

However, the wall surface examination system described in Patent Literature 1 above has the following problem. More specifically, even if an exterior wall of a building can be examined (diagnosed) simply and efficiently without erecting scaffolding, when a damaged place (faulty place) is found by the diagnosis, that place must be repaired. However, this repair work is carried out in the same way as the conventional one, where scaffolding is erected and workers directly carry out repair work.

The present invention has been made in view of the foregoing point, and an object thereof is to provide an exterior wall repair device and an exterior wall repair method capable of performing repair work of an exterior wall of a building by remote control without erecting scaffolding around the building.

Solution to Problems

[1] In order to achieve the foregoing object, the present invention provides an exterior wall repair device including a travel path body provided on a rooftop of a target for exterior wall repairs, a carriage having a traveling part capable of traveling on the travel path body and a suspending lifting/lowering part, a repair device main body having a gondola suspended and moved up and down by the suspending lifting/lowering part, a manipulator arranged at a predetermined place of the gondola and performing repair work, a shooting part capable of shooting images of a region to be repaired by the manipulator, a fixing device for detachably fixing the gondola to a predetermined place on an exterior wall surface, and a belt or rope having both end portions fixed to suction cups of the fixing device or attaching/detaching means fixable to the exterior wall surface, wound around a drive part of the manipulator, and configured to suppress separation of the gondola from the exterior wall surface during work of the manipulator, and a remote control part having a monitor on which an operator can see an image from the shooting part and operation gloves operated by the operator and capable of remotely operating the manipulator in synchronization with the manipulator.

In the exterior wall repair device of the present invention, the traveling part of the carriage can move by traveling on the travel path body provided on the rooftop of the target for the exterior wall repairs. The carriage suspends the gondola of the repair device main body and can move up and down the gondola by the suspending lifting/lowering part. The gondola of the repair device main body can be detachably fixed to the predetermined place on the exterior wall surface by the fixing device.

The manipulator arranged at the predetermined place of the gondola carries out the repair work by remote control by the operator. The operator performs an operation using the operation gloves of the remote control part, the manipulator operates in synchronization with the operation gloves, and the repairs can be performed with a realistic sensation as if the operator were actually working at the site while looking at the image from the shooting part capable of shooting images of the region to be repaired by the manipulator on the monitor.

Further, since the repair device main body has the belt or rope having both end portions fixed to the suction cups of the fixing device or the attaching/detaching means fixable to the exterior wall surface, wound around the drive part of the manipulator, and configured to suppress the separation of the gondola from the exterior wall surface during the work of the manipulator, the separation of the gondola from the exterior wall surface during the work of the manipulator, for example, when performing work that applies pressure or impact to the exterior wall surface such as using an impactor can be more reliably suppressed.

As described above, with the exterior wall repair device, the repair work of an exterior wall of a building such as a tall building can be performed by remote control without erecting scaffolding around the building.

[2] In order to achieve the foregoing object, the present invention provides an exterior wall repair device including a repair device main body having a gondola suspended and moved up and down by a carriage capable of traveling along a travel path body provided on a rooftop of a target for exterior wall repairs and having a suspending lifting/lowering part, a manipulator arranged at a predetermined place of the gondola and performing repair work, a shooting part capable of shooting images of a region to be repaired by the manipulator, a fixing device for detachably fixing the gondola to a predetermined place on an exterior wall surface, and a belt or rope having both end portions fixed to suction cups of the fixing device or attaching/detaching means fixable to the exterior wall surface, wound around a drive part of the manipulator, and configured to suppress separation of the gondola from the exterior wall surface during work of the manipulator, and a remote control part having a monitor on which an operator can see an image from the shooting part and operation gloves operated by the operator and capable of remotely operating the manipulator in synchronization with the manipulator.

The exterior wall repair device of the present invention has the same action and effect as those of the exterior wall repair device of the above [1], and the repair work of an exterior wall of a building such as a tall building can be performed by remote control without erecting scaffolding around the building.

[3] The exterior wall repair device according to the present invention can be configured to have a remotely operable percussion instrument for percussion testing for diagnosing the exterior wall of the building.

In this case, by operating the percussion instrument to percuss the exterior wall and obtaining percussion sound data, etc., the condition of the exterior wall surface can be determined and analyzed. This allows the exterior wall repair device to perform repair work as a series of operations if any faulty place is found from the diagnosis of the exterior wall, making it possible to improve the efficiency of the work.

[4] The exterior wall repair device according to the present invention can be configured such that the percussion instrument is provided at both end portions in a horizontal movement direction of the gondola.

In this case, for example, the percussion instrument on the right side (one end side) in the horizontal movement direction can be used when percussing such that the repair device main body does not protrude from the right end of the exterior wall surface, and the percussion instrument on the left side (the other end side) can be used when percussing such that the repair device main body does not protrude from the left end of the exterior wall.

[5] In order to achieve the foregoing object, the present invention provides an exterior wall repair method including a step of diagnosing an exterior wall of a building to identify a faulty place based on obtained data, a step of aligning with the faulty place a working part by a manipulator provided to a gondola vertically movably suspended so as to be along an exterior wall surface and capable of moving horizontally, a step of winding a belt or rope having both end portions fixed to attaching/detaching means detachably fixed to the exterior wall surface around a drive part of the manipulator to suppress separation of the gondola from the exterior wall surface during work of the manipulator, and a step of performing repair work of the exterior wall surface by the manipulator that operates in synchronization with remote control using operation gloves performed by an operator while watching a video of a monitor showing a state of the working part.

According to the exterior wall repair method of the present invention, the exterior wall of the building is diagnosed and a faulty place can be identified based on the obtained data. Further, by aligning with the faulty place the working part by the manipulator provided to the gondola vertically movably suspended so as to be along the exterior wall surface and capable of moving horizontally, the work by the manipulator is enabled.

The repair work of the exterior wall surface is performed by the manipulator that operates in synchronization with the remote control using the operation gloves performed by the operator while watching the video of the monitor showing the state of the working part, whereby the work can be performed with a realistic sensation as if the operator were actually working at the site. With this method, the repair work of an exterior wall of a building such as a tall building can be performed by remote control without erecting scaffolding around the building.

Further, since the repair device main body has the belt or rope having both end portions fixed to the suction cups of the fixing device or the attaching/detaching means fixable to the exterior wall surface, wound around the drive part of the manipulator, and configured to suppress the separation of the gondola from the exterior wall surface during the work of the manipulator, the separation of the gondola from the exterior wall surface during the work of the manipulator, for example, when performing work that applies pressure or impact to the exterior wall surface such as using an impactor can be more reliably suppressed.

[6] The exterior wall repair device according to the present invention can be configured such that the diagnosis of the exterior wall of the building is performed using a remotely operable percussion instrument for percussion testing and a microphone for collecting percussion sound of the percussion instrument.

In this case, by operating the percussion instrument to percuss the exterior wall and obtaining percussion sound data, etc., by the microphone, the condition of the exterior wall surface can be determined and analyzed. This allows the exterior wall repair device to perform repair work as a series of operations if any faulty place is found from the diagnosis of the exterior wall, making it possible to improve the efficiency of the work.

[7] The exterior wall repair device according to the present invention can be configured such that the percussion instrument is provided at both end portions in a horizontal movement direction of the gondola.

In this case, for example, the percussion instrument on the right side (one end side) in the horizontal movement direction can be used when percussing such that the repair device main body does not protrude from the right end of the exterior wall surface, and the percussion instrument on the left side (the other end side) can be used when percussing such that the repair device main body does not protrude from the left end of the exterior wall.

[8] In order to achieve the foregoing object, the present invention provides an exterior wall repair device including a travel path body provided on a rooftop of a target for exterior wall repairs, a carriage having a traveling part capable of traveling on the travel path body and a suspending lifting/lowering part, a repair device main body having a gondola suspended and moved up and down by the suspending lifting/lowering part, a manipulator arranged at a predetermined place of the gondola and performing repair work, a shooting part capable of shooting images of a region to be repaired by the manipulator, a percussion instrument for percussion testing provided at both end portions in a horizontal movement direction of the gondola, and a fixing device for detachably fixing the gondola to a predetermined place on an exterior wall surface, and a remote control part having a monitor on which an operator can see an image from the shooting part and operation gloves operated by the operator and capable of remotely operating the manipulator in synchronization with the manipulator.

In the exterior wall repair device of the present invention, the traveling part of the carriage can move by traveling on the travel path body provided on the rooftop of the target for the exterior wall repairs. The carriage suspends the gondola of the repair device main body and can move up and down the gondola by the suspending lifting/lowering part. The gondola of the repair device main body can be detachably fixed to the predetermined place on the exterior wall surface by the fixing device.

The manipulator arranged at the predetermined place of the gondola carries out the repair work by remote control by the operator. The operator performs an operation using the operation gloves of the remote control part, the manipulator operates in synchronization with the operation gloves, and the repairs can be performed with a realistic sensation as if the operator were actually working at the site while looking at the image from the shooting part capable of shooting images of the region to be repaired by the manipulator on the monitor.

Further, since the percussion testing is conducted by each percussion instrument provided at both end portions in the horizontal movement direction of the gondola, for example, the percussion instrument on the right side (one end side) in the horizontal movement direction can be used when percussing such that the repair device main body does not protrude from the right end of the exterior wall surface, and the percussion instrument on the left side (the other end side) can be used when percussing such that the repair device main body does not protrude from the left end of the exterior wall.

As a result, the repair work of an exterior wall of a building such as a tall building can be performed by remote control without erecting scaffolding around the building.

[9] In order to achieve the foregoing object, the present invention provides an exterior wall repair device including a repair device main body having a gondola suspended and moved up and down by a carriage capable of traveling along a travel path body provided on a rooftop of a target for exterior wall repairs and having a suspending lifting/lowering part, a manipulator arranged at a predetermined place of the gondola and performing repair work, a shooting part capable of shooting images of a region to be repaired by the manipulator, a percussion instrument for percussion testing provided at both end portions in a horizontal movement direction of the gondola, and a fixing device for detachably fixing the gondola to a predetermined place on an exterior wall surface, and a remote control part having a monitor on which an operator can see an image from the shooting part and operation gloves operated by the operator and capable of remotely operating the manipulator in synchronization with the manipulator.

The exterior wall repair device of the present invention has the same action and effect as those of the exterior wall repair device of the above [8], and the repair work of an exterior wall of a building such as a tall building can be performed by remote control without erecting scaffolding around the building.

[10] The exterior wall repair device according to the present invention can be configured such that the fixing device has a configuration in which a suction cup of a vacuum device sticks fast to an exterior wall.

In this case, in the exterior wall repair device, the suction cup of the vacuum device of the fixing device sticks fast to the exterior wall. As a result, a continuous reliable suction force with respect to the exterior wall surface can be obtained if the inside of the suction cup is vacuum, so that the gondola of the exterior wall repair device can be prevented from being separated from the exterior wall surface due to a repulsive force of pressure exerted by a tool, etc., on the exterior wall surface during the work by the manipulator.

[11] The exterior wall repair device of the present invention can be configured to have a microphone for collecting percussion sound of the percussion instrument.

In this case, by operating the percussion instrument to percuss the exterior wall and obtaining percussion sound data, etc., by the microphone, the condition of the exterior wall surface can be determined and analyzed. This allows the exterior wall repair device to perform repair work as a series of operations if any faulty place is found from the diagnosis of the exterior wall, making it possible to improve the efficiency of the work.

[12] In order to achieve the foregoing object, the present invention provides an exterior wall repair method including a step of vertically and horizontally moving a gondola vertically movably suspended so as to be along an exterior wall surface of a building and capable of moving horizontally, performing percussion testing by each percussion instrument provided at both end portions in a horizontal movement direction of the gondola and also diagnosing an exterior wall, and identifying a faulty place based on obtained data, a step of aligning with the faulty place a working part where work is performed by a manipulator provided to the gondola and synchronized with remote control using operation gloves by an operator, and a step of performing repair work of the exterior wall surface by the manipulator that operates in synchronization with the remote control using the operation gloves performed by the operator while watching a video of a monitor showing a state of a region to be repaired where the working part works.

According to the exterior wall repair method of the present invention, the exterior wall of the building is diagnosed and a faulty place can be identified based on the obtained data. Further, by aligning with the faulty place the working part by the manipulator provided to the gondola vertically movably suspended so as to be along the exterior wall surface and capable of moving horizontally, the work by the manipulator is enabled.

The repair work of the exterior wall surface is performed by the manipulator that operates in synchronization with the remote control using the operation gloves performed by the operator while watching the video of the monitor showing the state of the working part, whereby the work can be performed with a realistic sensation as if the operator were actually working at the site. With this method, the repair work of an exterior wall of a building such as a tall building can be performed by remote control without erecting scaffolding around the building.

Further, since the percussion testing is conducted by each percussion instrument provided at both end portions in the horizontal movement direction of the gondola, for example, the percussion instrument on the right side (one end side) in the horizontal movement direction can be used when percussing such that the repair device main body does not protrude from the right end of the exterior wall surface, and the percussion instrument on the left side (the other end side) can be used when percussing such that the repair device main body does not protrude from the left end of the exterior wall.

[13] The exterior wall repair method of the present invention can be configured such that the percussion testing of the exterior wall surface is performed using a microphone for collecting percussion sound of the percussion instrument.

In this case, by operating the percussion instrument to percuss the exterior wall and obtaining percussion sound data, etc., by the microphone, the condition of the exterior wall surface can be determined and analyzed. This allows the exterior wall repair device to perform repair work as a series of operations if any faulty place is found from the diagnosis of the exterior wall, making it possible to improve the efficiency of the work.

Advantageous Effects of the Invention

The present invention can provide an exterior wall repair device and an exterior wall repair method capable of performing repair work of an exterior wall of a building by remote control without erecting scaffolding around the building.

DESCRIPTION OF THE EMBODIMENTS

Figure 1:
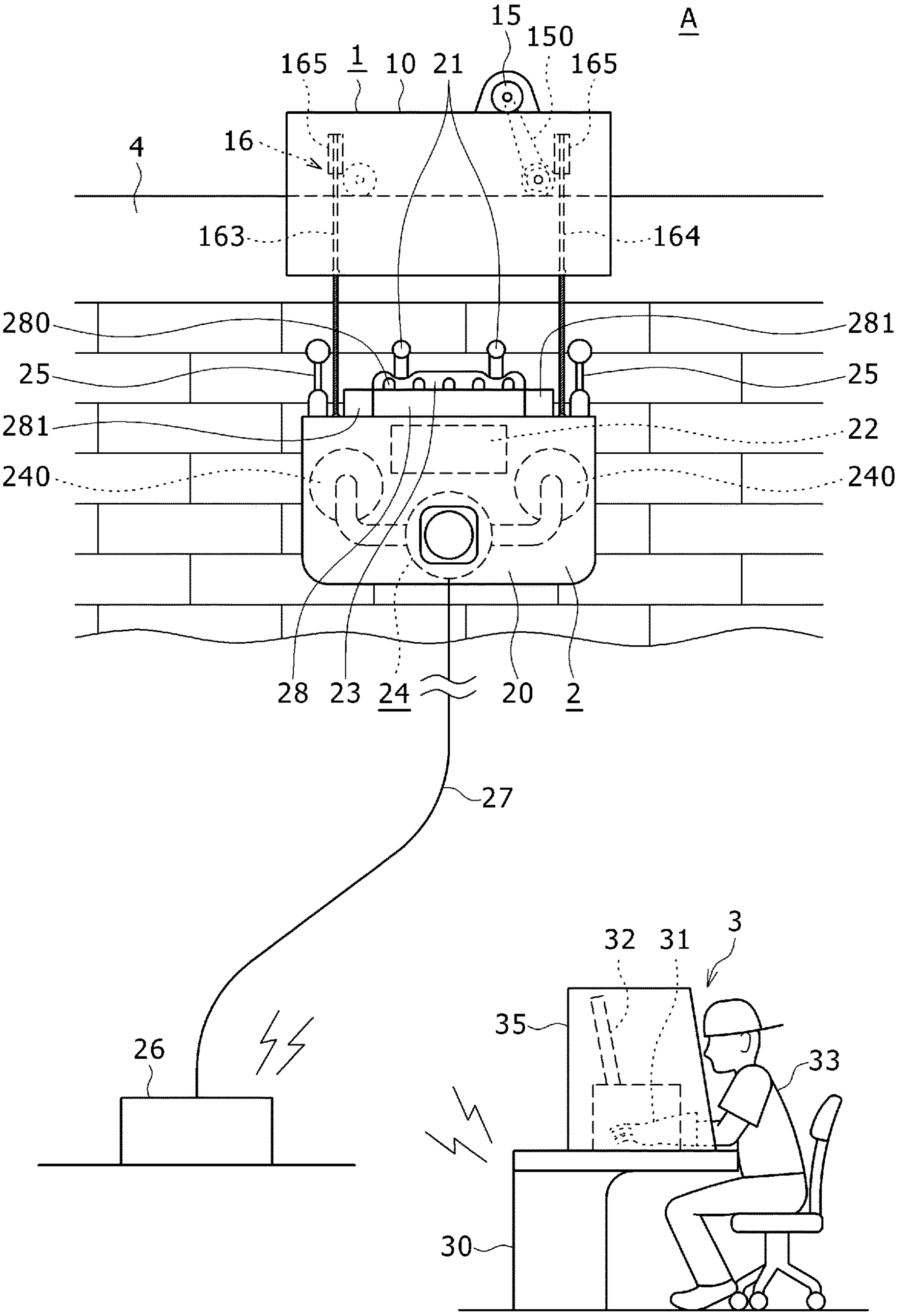
FIG. 1 is a schematic explanatory diagram showing an embodiment of an exterior wall repair device according to the present invention.

An embodiment of the present invention will be described in detail with reference to FIG. 1 to FIG. 5.

An exterior wall repair device A includes a travel path body 4 installed on a parapet 5 of a rooftop of a building, a carriage 1 configured to be horizontally movable along the travel path body 4, a repair device main body 2 vertically movably suspended from the carriage 1 by wires 163, 164 capable of being drawn out of winch devices 161, 162, and a remote control part 3 capable of remotely operating a manipulator 21 provided to the repair device main body 2. In the following, the structure of each part will be described.

In the following description, the terms "upper/lower," "left/right," and "front/rear" may be used in describing the direction of movement, the position of a specific place, etc. Basically, they are based on FIG. 1, and the upper and lower sides of the direction and the position along the paper surface direction of FIG. 1 are upper/lower as they are, the left and right sides are "left/right", and the near and far sides in the front and back direction of the paper surface are "front/rear".

(Travel Path Body 4)

The travel path body 4 is fixed along the parapet 5 of the rooftop with a necessary length. The travel path body 4 may be of a type in which a plurality of ones are connected or may be of a single type of a certain length. The travel path body 4 has a base plate 40 having a lateral U-shaped cross section that can be attached to and detached from the parapet 5 via a mounting means (not shown). Rails 41 are provided on an upper surface of the base plate 40 in parallel with the length direction (see FIG. 1 and FIG. 3).

When no parapet is provided to the rooftop or the strength of the parapet is structurally insufficient, a removable travel path body can be constructed, for example, by using a strong stand (not shown), etc., that can be fixed to the rooftop and combining rails corresponding to the stand.

(Carriage 1)

The carriage 1 that can move by traveling on the travel path body 4 has a main body 10 having a predetermined size and also serving as a frame. The main body 10 has a structure in which a horizontal upper plate 101 and a vertical front plate 102 are connected by a curved plate 103 at an upper portion of the front side (left side in FIG. 3). Further, a main body frame 11 is fixed to a lower surface of the upper plate 101, and sufficient strength is given as the entire frame (the main body 10 and the main body frame 11).

Undercarriages 12 are fixed to a lower surface of the main body frame 11 at predetermined intervals on the left and right sides and in the front/rear direction. An axle 13 is rotatably passed through each of the left and right undercarriages 12, and wheels 14 are fixed to each axle 13. Power of a traveling motor 15 fixed to the upper plate 101 is transmitted to the right axle 13 via a transmission chain 150 (see FIG. 1 and FIG. 3). These constitute a traveling part, and the carriage 1 can be moved in the left/right direction along the travel path body 4 by the traveling part.

A support roller 17 is provided at two places on left and right lower sides of a rear portion of the main body 10. Each support roller 17 can rotate and move in contact with a lower surface of the parapet 5 and can support the travel path body 4 so as not to be detached from the parapet 5 (see FIG. 3).

The carriage 1 is provided with a suspending lifting/lowering part 16 suspending and capable of moving up and down the repair device main body 2 described later. The suspending lifting/lowering part 16 includes two, left and right, winch devices 161, 162. The winch devices 161, 162 are configured such that wires 163, 164 are drawn forward.

Figure 2:
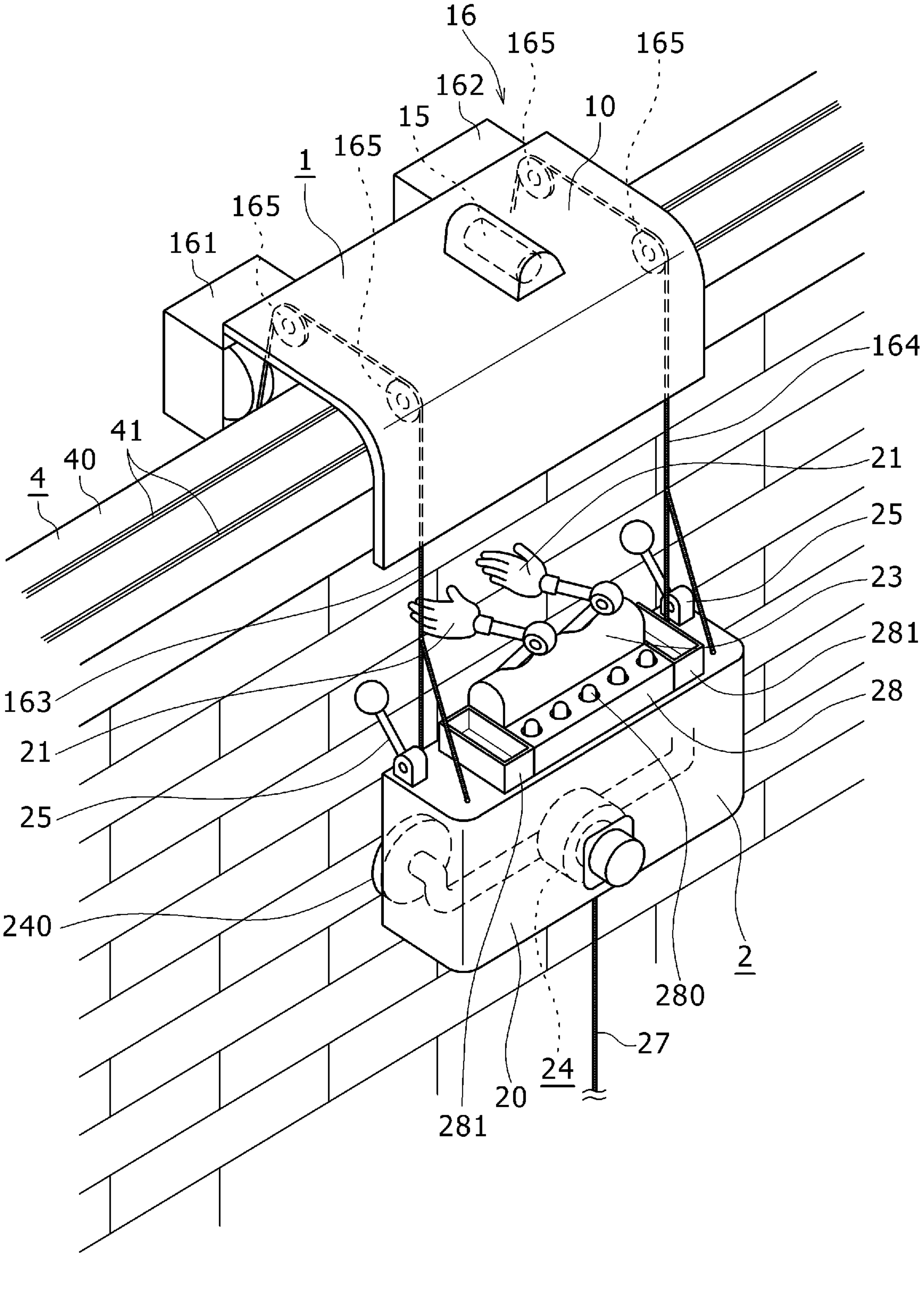
FIG. 2 is a perspective explanatory diagram showing structures of a carriage and a repair device main body of the exterior wall repair device shown in FIG. 1.
Figure 3:
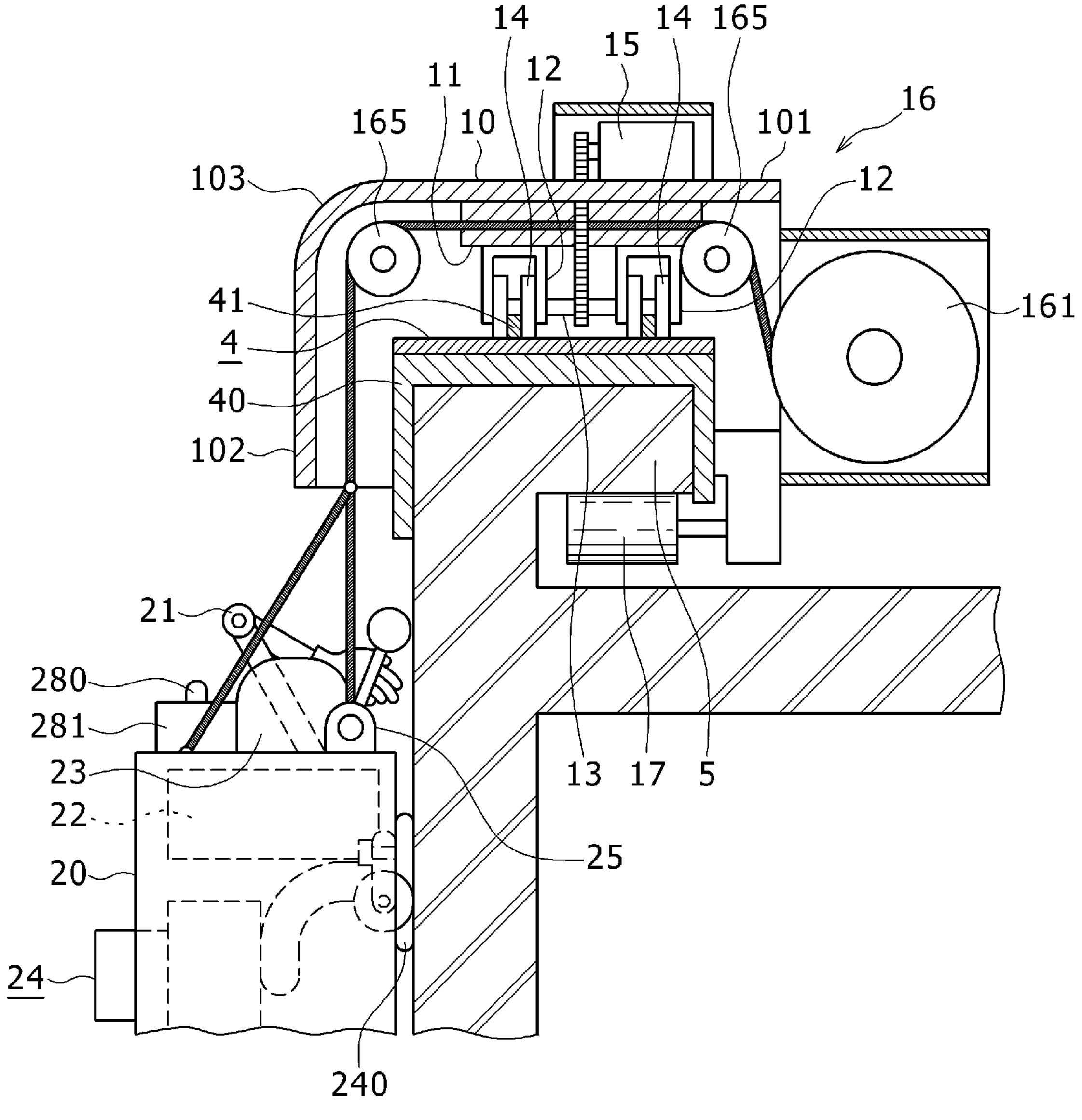
FIG. 3 is a sectional explanatory diagram showing the structures of the carriage and the repair device main body of the exterior wall repair device.

The wires 163, 164 each pass through pulleys 165, are hung down from a front portion of the carriage 1, and have a tip to which the repair device main body 2 is horizontally attached (see FIG. 1 and FIG. 2). Further, power supply to the carriage 1 is configured to be performed by power supply equipment of the building to be repaired although not illustrated.

It also can be configured such that the traveling system (the traveling motor 15, the transmission chain 150, etc.) and the lifting/lowering drive system (the winch devices 161, 162, etc.) above are provided with a counter for measuring an amount of movement, and in the repair work, the coordinates of a gondola 20 having been identified when there has been a problem in a test of percussion, etc., are designated, thereby allowing the repair device main body 2 to be quickly moved to a position where the work on the exterior wall surface is to be performed.

(Repair Device Main Body 2)

The repair device main body 2 has a gondola 20 suspended by the wires 163, 164. On the rear side of an upper surface of the gondola 20, a manipulator 21 serving as a part (working part) for performing repair work of the exterior wall is provided. The manipulator 21 is a support robot having the specifications of a humanoid arm in the present embodiment (see FIG. 2).

In the vicinity of the manipulator 21, a shooting part 29 (see FIG. 4, not shown in FIG. 1 to FIG. 3) is provided for shooting images of the working state on the exterior wall surface by the manipulator 21 in the form of a moving image.

The shooting part 29 is configured to shoot images of the state of the working part where the work is performed by the manipulator 21 and the vicinity of a tool box 28 and material boxes 281 described later at a plurality of different angles, and the image is displayed on a monitor 32 described later.

The manipulator 21 is driven by a drive part 23 controlled by a control part 22 inside the gondola 20. The manipulator 21 is operated in synchronization with finger movements of an operator 33 via a remote control part 3 described later. The operation will be described later.

Figure 5:
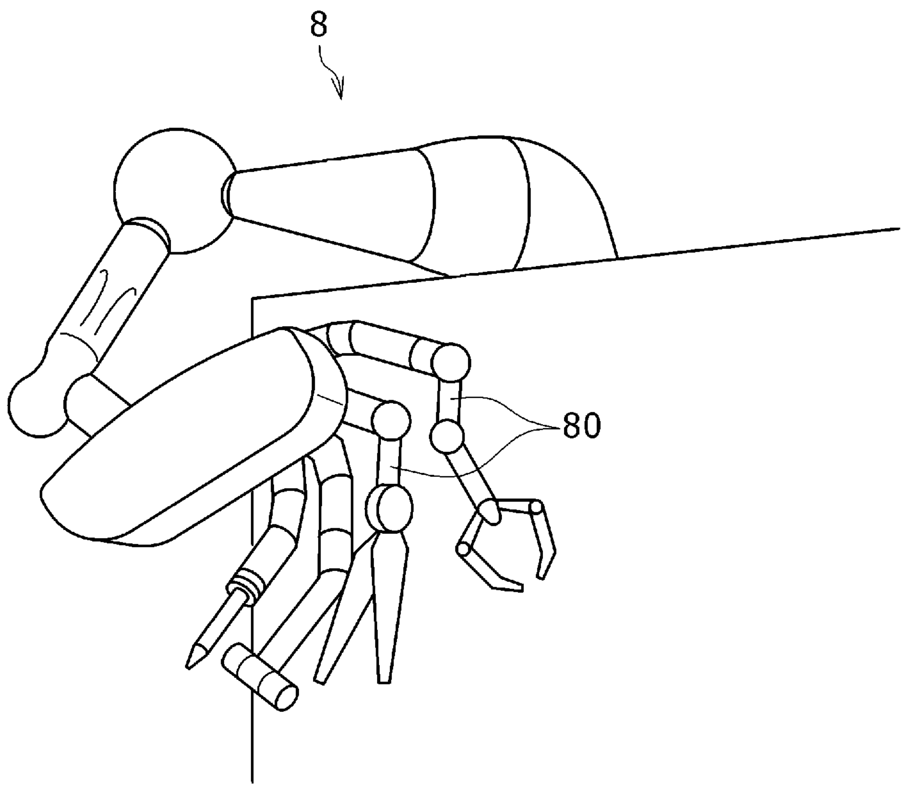
FIG. 5 is an explanatory diagram showing another example of a manipulator.

The manipulator is not limited to the humanoid arm specifications as in the present embodiment, and as shown in FIG. 5 for example, it also can be configured to perform the repair work of the exterior wall by a combination of a manipulator 8 similar to a medical manipulator and the remote control part 3.

In this case, a plurality of working arm parts 80 provided to the manipulator 8 each have a tip portion provided with a dedicated tool to be used for the work in advance, and it can be configured such that the work using the tool is possible by the operation of the remote control part 3. In this configuration, there is no need to exchange tools each time the work changes, allowing for more efficient work.

A tool box 28, which is a storage part, is provided adjacently in front of the manipulator 21 on the upper surface of the gondola 20 (on the side opposite to the exterior wall). A variety of tools 280 necessary for the repair work are stored in the tool box 28, and the manipulator 21 is operated so that the necessary tools 280 can be taken out or stored (the tools 280 are illustrated schematically in a simplified manner for convenience in each figure).

A material box 281, which is a storage part, is provided on both left and right sides of the tool box 28. Various tools and materials such as anchor pins, anchor cutting tools (impactors, dedicated bits), cutting hole cleaning brushes, epoxy resins, injection guns, after-work trash cans, and replacement tiles can be stored in the tool box 28 and the material boxes 281.

The manipulator 21 can be flipped forward, and the shooting part 29 above is configured to shoot images of the vicinity of the tool box 28 and the material boxes 281 on the front side of the manipulator 21, as described above. As a result, the operator 33 can take out and store each tool 280 and material by the manipulator 21 while looking at the image by the shooting part 29 on the monitor 32. The tool box 28 and the material boxes 281 can also be arranged behind the manipulator 21 (on the side closer to the exterior wall).

Further, a percussion instrument 25 for percussion testing is provided on the left and right sides of the manipulator 21 on the upper surface of the gondola 20. The percussion instrument 25 having a structure in which a ball is attached to the tip of a swingable rod is shown in the present embodiment, but it may be simply rod-shaped or drumstick-shaped.

In the vicinity of each percussion instrument 25, a sound collection microphone (not shown) for collecting percussion sound is provided. Each percussion instrument 25 can be remotely operated by the operator 33 as described later, and, for example, the sound when hitting the exterior wall surface is recorded as data and analyzed or the operator 33 listens to the sound and judges, thereby allowing abnormalities of the exterior wall such as lifting, cracks, etc., of tiles to be detected.

In the present embodiment, the repair device main body 2 is provided with the percussion instruments 25 and the percussion instruments 25 are remotely operated to perform percussion. However, the present invention is not limited thereto, and a percussion rod or percussion hammer may be held by the manipulator 21 and the percussion work may be performed by the operation of the manipulator 21 by the remote control part 3 described later.

A vacuum device 24 constituting a fixing device is housed inside the gondola 20. The vacuum device 24 has a vacuum pump (reference sign omitted), and an intake pipe (reference sign omitted) connected to the vacuum pump extends up to the left and right sides of the gondola 20, and tip portions of the intake pipe are respectively connected to suction cups 240 provided at two, left and right, places on the rear surface of the gondola 20. As a result, the repair device main body 2 can be sucked and fixed to the exterior wall when the vacuum device 24 is activated to evacuate the inside of the suction cups 240.

(Remote Control Part 3)

The repair device main body 2 above can be operated by the operator 33 operating the remote control part 3. The remote control part 3 has a main body table 30 in which a communication device (not shown), etc., are housed. A working hood 35 for shielding light is provided on a top plate (reference sign omitted) of the main body table 30.

A monitor 32 is provided inside the working hood 35, and the operator 33 can check an image displayed on the monitor 32. The monitor can also adopt, for example, a head mounted display (HMD)-like monitor for games. In this case, it can be expected that a more detailed and accurate work with a more realistic sensation is enabled.

Operation gloves 31 are provided on the top plate. The operation gloves 31 have a flexible glove shape and are provided with a sensor (not shown) that delicately detects finger movements at a portion corresponding to each finger. According to this configuration, when the operator 33 wears the operation gloves 31 and moves the fingers, the above manipulator 21 also can move synchronously following the movement of each finger of the operation gloves 31, reproduce the finger movements of the operator 33, and perform the work.

Various kinds of information signals such as information signals from the operation gloves 31 and a switch part 34 (see FIG. 4, not shown in FIG. 1 to FIG. 3) are transmitted from the communication device of the main body table 30 and received by a relay 26 installed on a road surface of a working site or mounted on a working vehicle, etc. The relay 26 and the above repair device main body 2 are connected by a transmission cable 27. The transmission cable 27 can supply power from the relay 26 to the repair device main body 2 together with the transmission of the various information signals.

(Control System)

Figure 4:
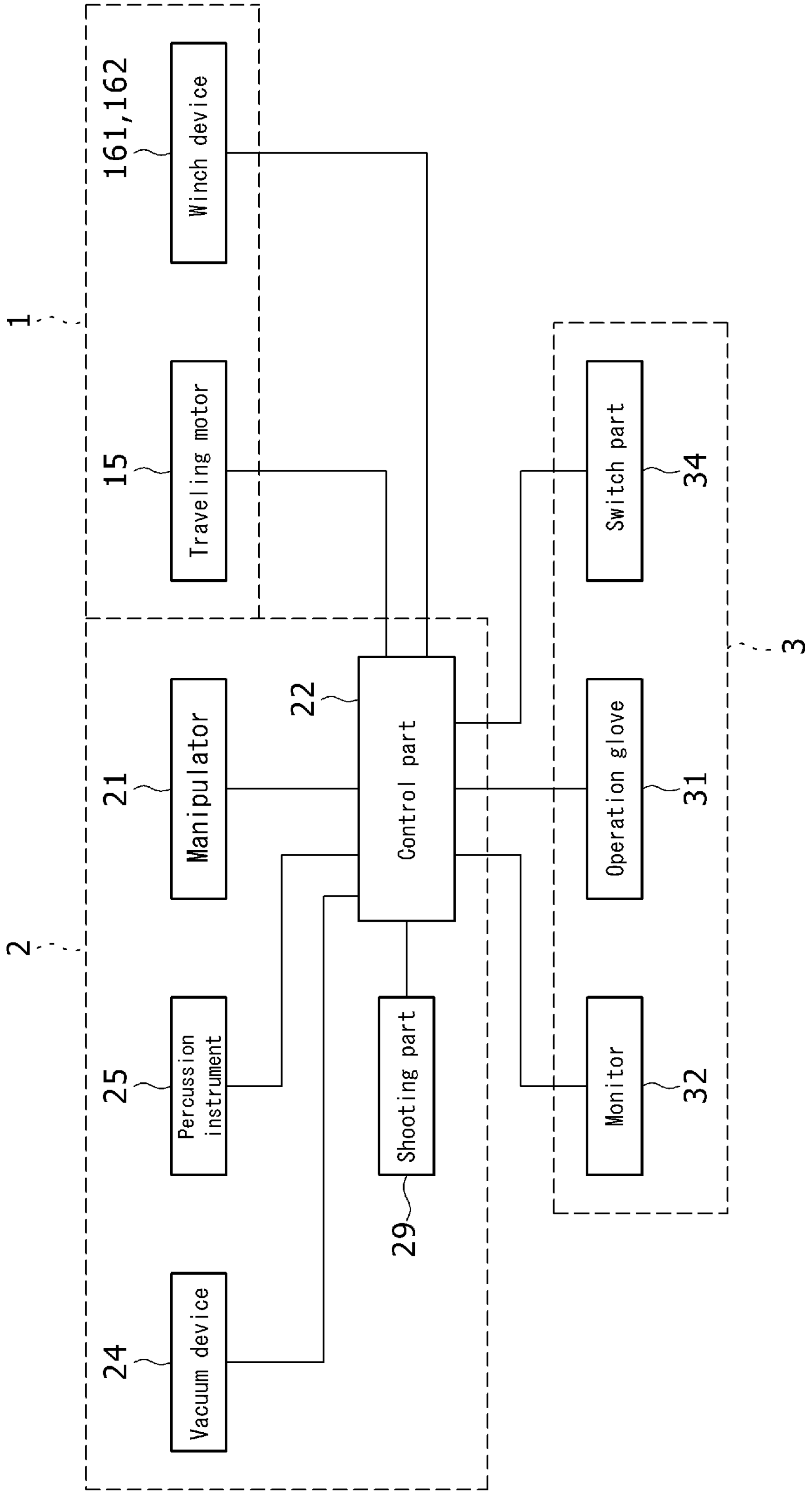
FIG. 4 is a block diagram showing a control system of the exterior wall repair device.

Referring now to a block diagram shown in FIG. 4, the outline of a control system of the exterior wall repair device A will be described. The control system includes, in the remote control part 3, the monitor 32 for displaying the image shot by the shooting part 29, the operation gloves 31 operated by the operator, and the switch part 34 for turning on/off various devices such as the traveling motor 15, the vacuum pump (reference sign omitted) of the vacuum device 24, the winch devices 161, 162. The control system also includes, in the carriage 1, the traveling motor 15 and the winch devices 161, 162 operated by the switch part 34.

Further, the control system includes, in the repair device main body 2, the control part 22 processing various information signals having been input in the remote control part 3 and transmitting control signals to the traveling motor 15, the vacuum pump, the winch devices 161, 162, etc., the manipulator 21 performing repair work in synchronization with the operation of the operation gloves 31, the shooting part 29 controlled by the control part 22 and shooting images of the working state in the region to be repaired by the manipulator 21, the vacuum device 24 for fixing the repair device main body 2 to the exterior wall surface, and the percussion instrument 25 for performing percussion of the exterior wall.

When data of the image shot by the shooting part 29 and data of the percussion sound collected at the time of percussion by the percussion instrument 25 are stored and analyzed, a data storage part for storing the image data, the percussion sound data, etc., and an analysis part for analyzing the data can be provided.

(Action)

With reference to FIG. 1 to FIG. 4, the action of the exterior wall repair device A and an exterior wall repair method using the exterior wall repair device A will be described. For convenience in facilitating understanding of the description, the case is described in which the control system of the exterior wall repair device A includes the data storage part and the analysis part having been described in the above paragraph.

(1) The operator 33 operates the switch part 34 to stop the carriage 1 and the repair device main body 2 at the start point (for example, an upper corner portion of one exterior wall surface among a plurality of exterior wall surfaces of a tall building, which is the building).

(2) The switch part 34 is operated to drive the winch devices 161, 162 of the repair device main body 2, and the wires 163, 164 are drawn out to lower the repair device main body 2, and the repair device main body 2 is stopped at a predetermined position. At this time, the right percussion instrument 25 is positioned at an upper end corner portion of the exterior wall surface (start position of percussion). At this position, the operator 33 operates the switch part 34 to activate the vacuum device 24 and fix the repair device main body 2 to the exterior wall with the suction cups 240. The left percussion instrument 25 is used when percussing such that the repair device main body 2 does not protrude from the left end of the exterior wall.

(3) The operator 33 checks the appearance of the exterior wall with the image (moving image or still image) sent from the shooting part 29 to the monitor 32. The image can be appropriately adjusted in angle and size by the operation of the remote control part 3 so as to facilitate the diagnosis. The percussion instrument 25 is operated by the switch part 34 to perform percussion testing, and position data (coordinate data) of the percussion position, image data corresponding to the percussion position, and percussion sound data by the percussion are obtained and stored in the data storage part.

(4) While the winch devices 161, 162 are operated to intermittently lower the repair device main body 2, the same percussion testing as in the above step (3) is performed at each stop position, and the position data of the percussion position, the image data corresponding to the percussion position, and the percussion sound data by the percussion are obtained in a predetermined range in the vertical direction of the exterior wall surface and stored in the data storage part.

(5) The repair device main body 2 is lifted back to the height of the above step (2), and the carriage 1 is moved by a predetermined moving distance, for example, by a width of one tile of the exterior wall and then stopped. Percussion testing is performed in the same steps as the above steps (2) to (4), and the position data of the percussion position, the image data corresponding to the percussion position, and the percussion sound data in a predetermined range in the vertical direction of the exterior wall surface are obtained and stored in the data storage part.

(6) Steps of the above steps (2) to (5) are repeated to perform percussion testing in a predetermined range of the exterior wall surface and obtain the position data of the percussion position, the image data corresponding to each position, and the percussion sound data. Normally, tiles are not 100% diagnosed, and a so-called sampling diagnosis is performed. However, depending on the scale of the building and the size and number of tiles, 100% diagnosis is not excluded.

(7) The position data, the image data corresponding to each position, and the percussion sound data stored by the data storage part are analyzed by the analysis part, a faulty (problem) place is identified by the position data, and a repair method for each faulty place is considered in advance. It also becomes possible to create, for example, vertical and horizontal tile layout diagrams based on each data obtained and stored as described above.

(8) Based on the position data of the faulty place, the repair device main body 2 is moved to the faulty place on the exterior wall surface. At this time, the position where the manipulator 21 can work is aligned with the position (coordinates) of the above faulty place. The repair device main body 2 is then fixed to the exterior wall surface by the suction cups 240 of the vacuum device 24.

For example, when a tool (for example, an impactor (impact driver), etc.) subjected to a repulsive force from the exterior wall surface is used at the time of performing the work by the manipulator 21, for example, a belt (or a wire), etc., having both end portions fixed to the left and right suction cups 240 (or attaching/detaching means fixable to the exterior wall surface) is wound around the drive part 23 of the manipulator 21, and the separation of the repair device main body 2 from the exterior wall surface during the work of the manipulator 21 can be further suppressed, although illustration is omitted.

In this case, the belt, etc., may be tightened as needed to enhance the suppressing effect. In addition, a sensor for detecting an amount of separation during the work may be provided to include a function of informing the operator 33.

(9) After the repair device main body 2 is fixed at a predetermined position, the operator 33 operates the operation gloves 31 of the remote control part 3 according to the repair method considered above, uses an appropriate tool 280 as needed, and performs repair work such as replacing tiles that have been, for example, lifted, peeled off, or cracked by the manipulator 21 moving in synchronization with the finger movements of the operator 33 while checking the image displayed on the monitor 32 in real time. After that, the same work as above is repeated to repair each faulty place, thereby completing the repair work.

The exterior wall repair method is not limited to the method of first diagnosing a predetermined range of the exterior wall by the repair device main body 2 to obtain data, and then analyzing the data to identify a faulty place, and moving the repair device main body 2 to the faulty place to perform repairs, as described above.

As another method, for example, it is also possible to adopt a method of obtaining data and analyzing the obtained data for each diagnostic position when the exterior wall is diagnosed, determining whether or not the state of the position (place) is faulty, moving to the next diagnostic position if not faulty, repairing the faulty place on the spot if faulty and moving to the next diagnostic position after the repairs, and thereafter repeating this.

As described above, with the exterior wall repair device A and the exterior wall repair method using the same, the repair work after an exterior wall of a building such as a tall building is diagnosed can be performed by remote control without erecting scaffolding around the building.

When the diagnosis and repair work of the exterior wall of the building are performed by workers with scaffolding erected around the building for example, work periods and budgets become problematic. When the diagnosis and repair work of the exterior wall of the building are performed by workers riding on a gondola suspended by wires, safety and operability become problematic.

However, with the exterior wall repair device A and the exterior wall repair method using the same according to the present invention, these problems can be solved. Further, by obtaining various data during the repair work, the repair work via the manipulator 21 can be made more accurate based on the data in corporation with, for example, AI (artificial intelligence) to improve the reliability.

The terms and expressions used in the present description and the claims are for descriptive purposes only and are not limiting in any way, and there is no intention to exclude terms and expressions equivalent to features and a part thereof described in the present description and the claims. Further, it is a matter of course that various modifications are possible within the scope of the technical concept of the present invention.

What is claimed is:

1. An exterior wall repair device comprising:

a travel path body provided on a rooftop of a target for exterior wall repairs;

a carriage having a traveling part capable of traveling on the travel path body and a suspending lifting/lowering part;

a repair device main body having a gondola suspended and moved up and down by the suspending lifting/lowering part, a manipulator arranged at a predetermined place of the gondola and performing repair work, a shooting part capable of shooting images of a region to be repaired by the manipulator, a percussion instrument for percussion testing provided at both end portions in a horizontal movement direction of the gondola, and a fixing device for detachably fixing the gondola to a predetermined place on an exterior wall surface; and a remote control part having a monitor on which an operator can see an image from the shooting part and operation gloves operated by the operator and capable of remotely operating the manipulator in synchronization with the manipulator.

2. An exterior wall repair device comprising:

a repair device main body having a gondola suspended and moved up and down by a carriage capable of traveling along a travel path body provided on a rooftop of a target for exterior wall repairs and having a suspending lifting/lowering part, a manipulator arranged at a predetermined place of the gondola and performing repair work, a shooting part capable of shooting images of a region to be repaired by the manipulator, a percussion instrument for percussion testing provided at both end portions in a horizontal movement direction of the gondola, and a fixing device for detachably fixing the gondola to a predetermined place on an exterior wall surface;

a microphone for collecting percussion sound of the percussion instrument; and a remote control part having a monitor on which an operator can see an image from the shooting part and operation gloves operated by the operator and capable of remotely operating the manipulator in synchronization with the manipulator.

3. The exterior wall repair device according to claim 2, wherein the fixing device has a configuration in which a suction cup of a vacuum device sticks fast to an exterior wall.

* * * * *